Aug. 17, 1943.  H. P. REIBER ET AL  2,327,217
VARIABLE PITCH PROPELLER CONTROL MECHANISM
Filed May 22, 1940  3 Sheets-Sheet 3

INVENTORS.
HARRY P. REIBER
JACK B. REIBER
BY Hawgood & Van Horn
their ATTORNEYS.

Patented Aug. 17, 1943

2,327,217

UNITED STATES PATENT OFFICE 2,327,217

VARIABLE PITCH PROPELLER CONTROL MECHANISM

Harry P. Reiber, Williamsport, Pa., and Jack B. Reiber, Ann Arbor, Mich., assignors of forty per cent to Arthur H. White, New York, N. Y.

Application May 22, 1940, Serial No. 336,620

2 Claims. (Cl. 170—163)

Our invention relates to a variable pitch propeller mechanism for aircraft, and relates more particularly to a simple and effective control means for varying or adjusting the angularity or pitch of propeller blades to meet various conditions in use, by overspeeding, underspeeding or balancing the control means with respect to the rotation of the engine shaft.

One of the objects of the invention is to provide a control mechanism for varying the pitch of propeller blades including means which will operate to overspeed, underspeed, balance, or reverse a control element with respect to the engine shaft, said means having driving connection with the propeller blades.

Another object of the invention is to provide a variable pitch propeller mechanism of this type which is of simple and compact design and is capable of being built into the propeller hub.

A further object resides in providing a mechanism of the type disclosed which is positive in operation and which can be operated either while the ship is in flight or on the ground, and which does not depend entirely upon operation of the aircraft engine for its performance.

Another object of the invention is a construction which enables the propeller blades when rotatably mounted in a hub, to be varied as to pitch simultaneously throughout a complete revolution of the blade axis, thus providing for pitch changes from zero pitch through low, high, feathering, or even a reverse or braking pitch.

Other objects and advantages of our invention will become more apparent as the following description of an embodiment thereof progresses, reference being made to the accompanying drawings in which like reference characters are employed to designate like parts throughout the same.

Figure 1:
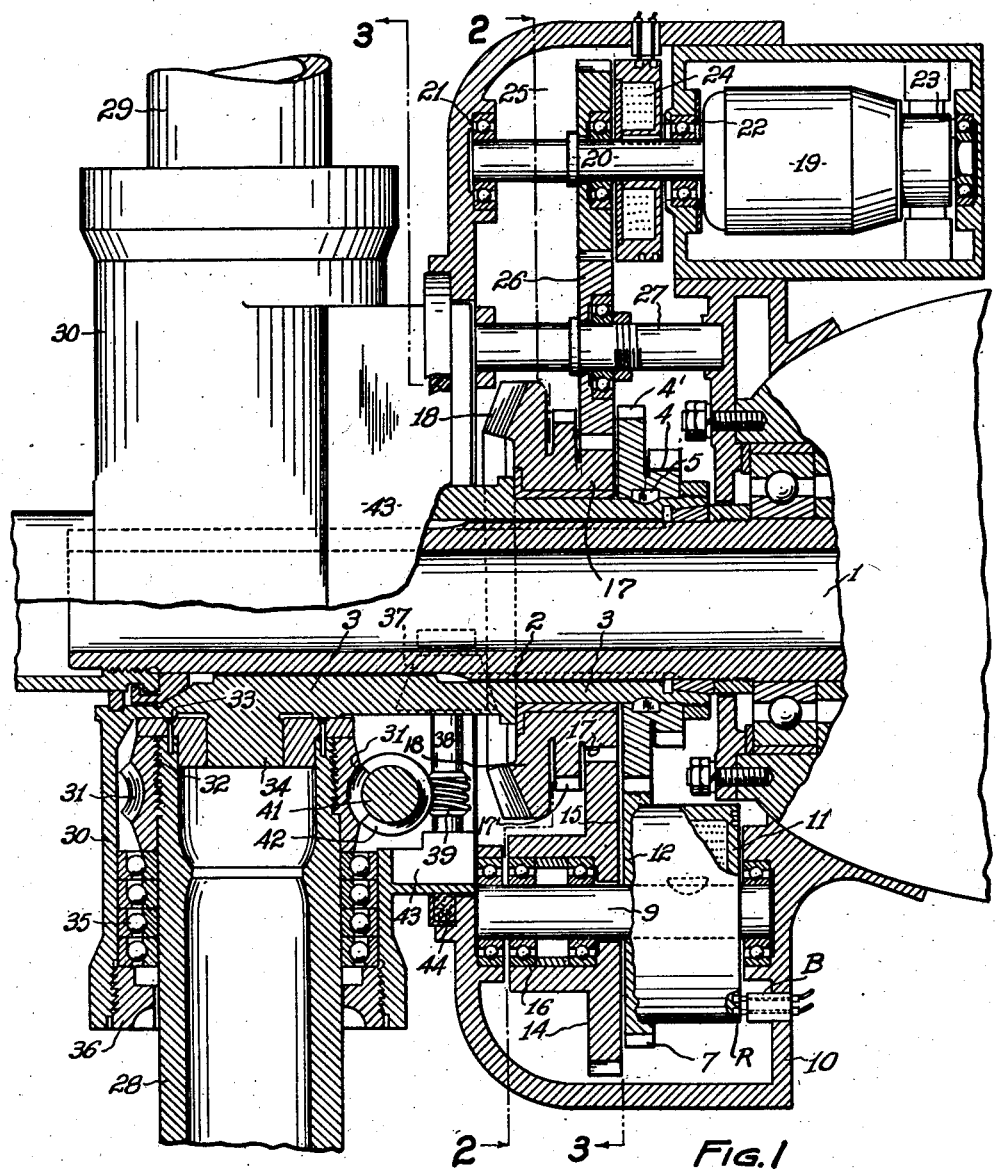
Figure 1 is a section taken on line 1—1 of Figure 2 through a propeller hub assembly to which our invention is applied.
Figure 2:
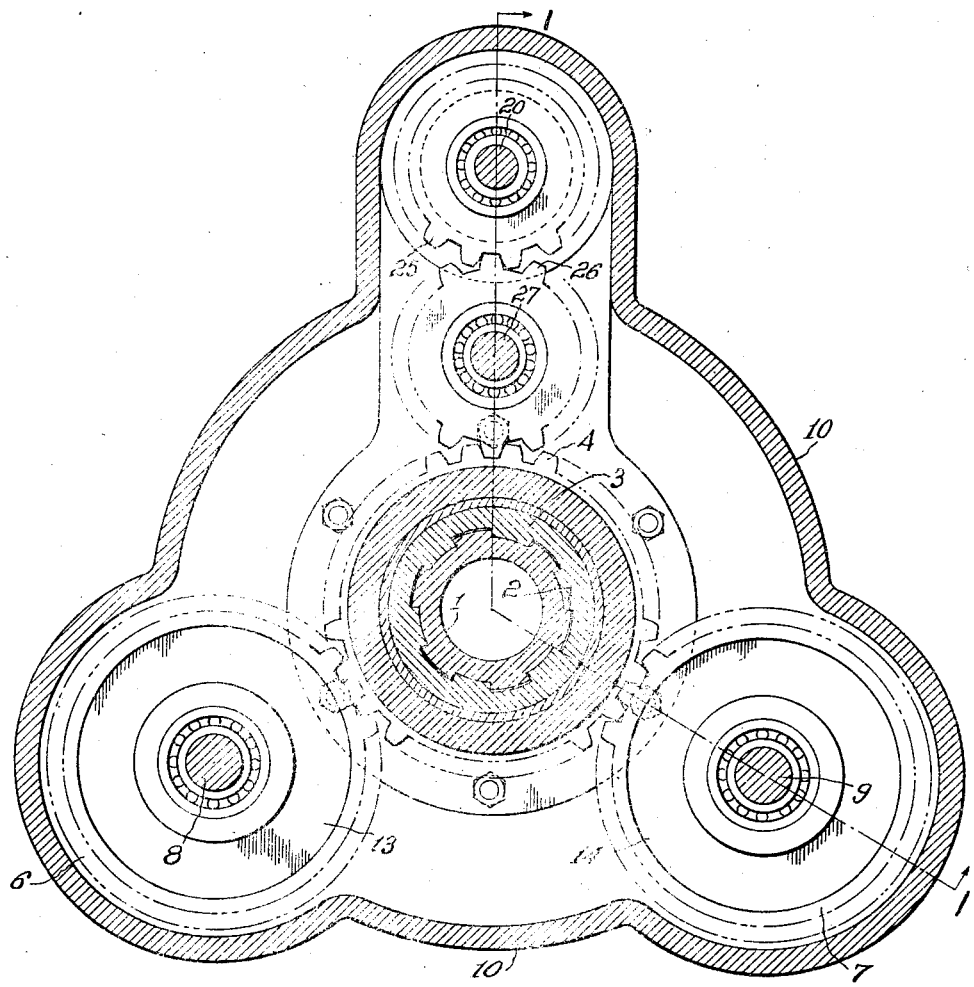
Figure 2 is a transverse section taken on line 2—2 of Figure 1.

Referring now more specifically to the accompanying drawings, we will proceed to describe the construction and operation of the embodiment illustrated therein, although it will be understood that we do not intend to be limited to the exact details of construction shown, since various changes may be made without departing from the spirit of the invention or the scope of the appended claims.

In carrying out our invention as illustrated in the drawings, the engine shaft 1 is splined at 2 to receive the hub barrel 3 for rotation with the shaft.

A spur gear 4 is keyed at 5 to the hub barrel 3, and is thereby driven with the engine shaft. The driven gear 4 is, of course, coaxial with the engine shaft, and its teeth are in mesh with the teeth of a pair of rotatable magnetic clutch members 6 and 7 keyed to the respective shafts 8 and 9 mounted in suitable bearings within the gear case or housing 10, which is rigidly secured to the airplane engine housing.

The rotatable clutch members each comprise the respective gear section 6 or 7 and an electromagnetic coil 11 having suitable connection through rings R and brushes B with a control switch, and a source of current for setting up a magnetic flux in the face 12 of the clutch members 6 and 7.

Rotatably mounted on the shafts 8 and 9 respectively are cooperating magnetic clutch members 13 and 14 having their clutching faces 15 closely spaced with respect to the clutch faces 12. The clutch members 13 and 14 are of different diameters and are rotatably mounted in bearings 16 on the shafts 8 and 9 respectively and are provided with gear teeth around their peripheries which are in constant mesh with the teeth 17 and 17' of the control gear rotatably carried on the hub barrel 3. The pitch diameters of the meshed gears 17 and 14 are such that they provide an over speed drive to the ring or control gear, while the pitch diameter of the meshed gears 17' and 13 will provide an underspeed drive for the ring or control gear.

The control gear is formed with a hypoid gear section 18 which has operative connection with the propeller gear trains.

In the upper portion of the gear case we have provided an auxiliary means for operating the control gear 18 to change the angularity or pitch of the propeller blades.

This means includes an electric motor 19 having a motor shaft 20 extending forwardly and mounted in suitable bearings 21, 22, and 23.

Keyed to the shaft 20 is a magnetic clutch member 24, and rotatably mounted on the shaft 20 is a cooperating clutch member 25 which has a driving connection through teeth formed on its periphery with an intermediate gear 26 rotatably mounted on a shaft 27 and in mesh with the teeth of the gear section 17 of the control gear independently rotatable on the engine shaft.

The motor 19 is of the reversible type so that through the cooperating clutch members 24 and 25 the control gear 18 may be rotated in either direction, thereby changing the angularity or pitch of the propeller blades in either direction.

Thus it will be seen that we have provided an extremely simple mechanism for operating the control gear 18 either through the engine shaft as a source of driving power or by auxiliary power provided by the electric motor 19 through suitable controls and current source located in the cockpit, to alter the pitch of the propeller blades.

The inner ends of the propeller blades are indicated at 28 and 29. Each blade is mounted for axial rotation in a hub extension 30. In the illustration the propeller is of the two blade type and of course the blades are mounted diametrically opposite each other, but the invention is equally well applied to propellers having additional blades, if desired.

Each blade end is insertable in one of the sleeve extensions and carries a worm gear 31 near its end. The worm gear member is threaded on to the blade end as at 32 and comprises an apertured cap portion 33 having locking connection with the butt end of the blade and acting as a bearing on the boss 34 formed on the hub barrel 3.

Anti-friction bearings 35 are interposed between the blade end and the hub extension 30 to rotatably support the blades therein, there being a retaining nut 36 threaded into the sleeve to hold the propeller blade and bearing assembly in place.

It will be seen that in order to transmit an overspeed or underspeed rotation of the control gear 18 to the blades in order to vary the pitch thereof, it becomes necessary to provide a driving connection between the control gear 18 and the worm gears 31 mounted on the propeller blade ends.

Figure 3:
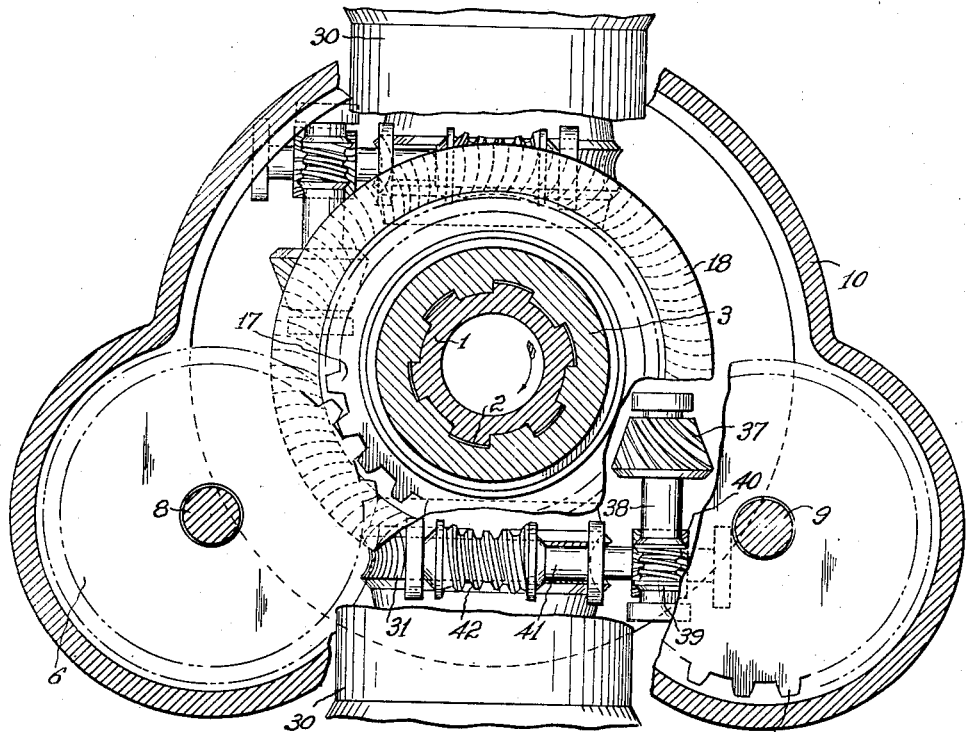
Figure 3 is a section taken in the direction of line 3—3 of Figure 1.

In further carrying out our invention we have provided a simple form of means for accomplishing this result as illustrated, particularly in Figures 1 and 3.

As pointed out above the hypoid control gear 18 may be actuated by, or independently of, the engine shaft 1 through the selected magnetic clutches. In either case we have provided means connecting the control gear with each blade for transmitting over or underspeed motion to the respective blades. This means includes a hypoid control pinion 37 mounted on a countershaft 38 carrying a worm 39 at one end.

The worm 39 is in mesh with a worm gear 40 keyed to the shaft 41. The latter in turn carries a worm 42 which may be termed the blade worm. The blade worm is positioned to mesh with the blade worm gear 31. (See Figure 1.) Due to the arrangement of the blade gear train 37, 39, 40, 42, and 31, the entire assembly can be made quite compact around the hub and within the housing 30, 32, and 10.

Suitable packing 44 is provided between the parts 43 and 10 of the housing to retain lubricant within the housing.

The blade gear train described above is, of course, individual with each blade, each train being driven simultaneously by the control gear 18.

Due to the fact that the blade worm gear trains are not reversible the control pinions carry the control gear around in the same direction of rotation as that of the engine shaft and at engine shaft speed, and, of course, the blade gear train 37, 39, 40, 42, and 31 are carried around in the hub housing 30 which is locked to the engine shaft, at engine speed. Thus this train is motionless with a dead engine. When not set in motion by energizing clutches 6 or 7 during rotation of the engine shaft, or by actuating the motor 19, the control gear 18 rotates at engine shaft speed due to the fact that the worm gear train locks against reverse operation. When the control gear is speeded up by energizing the magnetic clutch coil 11 of the clutch member 7 or by operation of the motor 19 in one direction, as is done when the engine shaft is not in motion, the control pinions 37 revolve in one direction to increase the blade pitch. When the rotating members 7 and 14 are thus coupled, the member 14, which may have a different pitch diameter than that of the clutch member 13, rotates the control gear 18 independently of the shaft 1 to drive the blade gear trains in a direction to increase the pitch of the blades.

When the control gear 18 is retarded in speed as by energizing the coil of the opposite magnetic clutch 6, and while revolving in the same direction as before, it will be seen that the control pinions 37 and blade gear train will tend to travel around the control gear 18 since the blade gear trains and the blades are rotating with the engine shaft, thereby causing a reversal of rotation of the propeller blades and decreasing their pitch. The rotating clutch member 13 may have a pitch diameter less than that of member 14 and has driving connection with the control gear through the teeth 17'.

In order that the blade pitch may be conveniently and positively varied and maintained at any desired point through an overspeed-underspeed mechanism such as we have illustrated and described, we also provide a simple centralized control on the instrument panel or at any convenient place in the cockpit of the aircraft, there being provided a suitable source of electric energy, such as storage batteries, and means for controlling the feeding of current to the magnetic clutches and the control motor.

Figure 4:
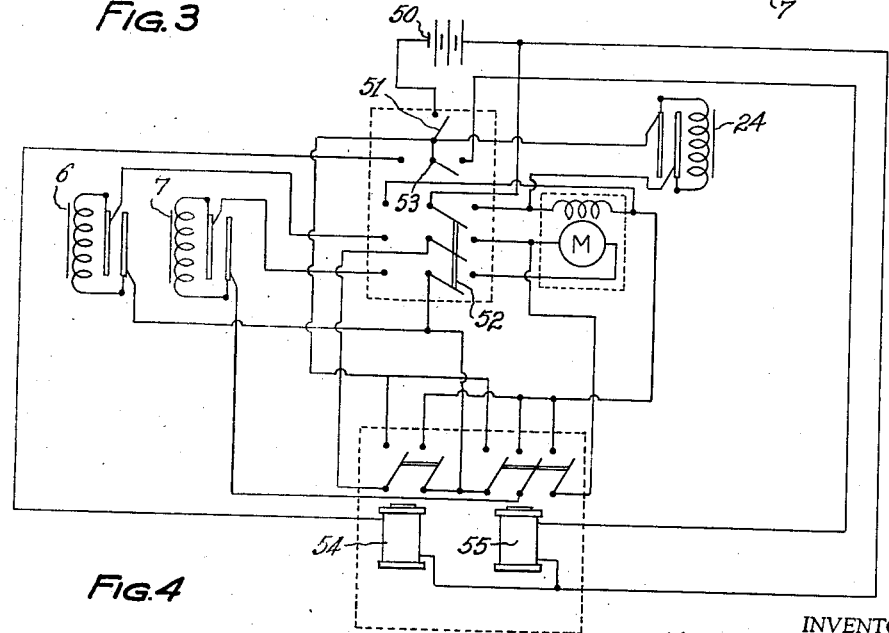
Figure 4 illustrates in diagrammatic form the electric circuits for controlling the operation of the device.

We have illustrated in Figure 4 a wiring diagram which enables the operator to overspeed or underspeed the control gear 18 with respect to the speed of the engine shaft when the latter is operating, or to actuate the reversible electric motor 19 and the auxiliary magnetic clutch 24 and thus rotate the control gear 18 in either direction when the airplane engine is not running.

Referring now more particularly to Figure 4, the current source is indicated at 50. A safety switch 51 is provided to cut out the entire control if desired.

A three pole double throw switch 52 is provided so that in one position a circuit may be closed for selectively operating either magnetic clutch 6 or 7 while in the opposite position a circuit may be closed through the motor 19 for operating the reversible motor in either direction and for energizing the magnetic clutch 24.

Intermediate the cut out switch 51 and the three pole switch 52, we provide a selector 53 by which the operator is enabled to select, through suitable relays 54 and 55, the operation of the underspeed clutch 6 or the overspeed clutch 7 when the engine is running, or by which he may select the direction of rotation of the motor shaft 20 of the auxiliary motor 19 in the event the engine is not running.

By our invention we have provided a relatively simple means for selectively controlling the pitch of propeller blades either during engine shaft rotation or independently thereof, and from the foregoing description and the accompanying drawings it is clear that the mechanism is easy to operate from the cockpit of the airplane with which it is used and that the operation is positive at all times and under all conditions to effectively select the pitch of the blades or even to reduce it to feathering or zero pitch, or to reverse the pitch for braking purposes. In any event the operation is smooth and effective.

Various changes may be made in the details of construction of our invention without departing from the spirit thereof or the scope of the appended claims.

We claim:

1. The combination with an engine shaft and a variable pitch propeller driven by said shaft, of means for varying the pitch of the blades of said propeller, said means comprising a gear rotatable with the engine shaft, a ring gear independently rotatable on said engine shaft, means driven by the ring gear to vary the pitch of the propeller blades, a plurality of pairs of gears each having driving connection with the ring gear and with the said engine shaft gear, one of the gears of each pair being slidable and having clutching engagement with the respective other gear of each pair, and means for actuating said sliding gears selectively, one of said gear pairs having an overspeed gear ratio and another of said gear pairs having an underspeed gear ratio with respect to the rate of rotation of the engine shaft.

2. The combination with an engine shaft and a variable pitch propeller driven by said shaft, of means for varying the pitch of the blades of said propeller, said means comprising a gear rotatable with the engine shaft, a ring gear independently rotatable on said engine shaft, means driven by the ring gear to vary the pitch of the propeller blades, a plurality of sets of gears each having driving connection with the ring gear and with the said engine shaft gear, an electromagnetic clutch in each gear set, and means for selectively actuating said electromagnetic clutches, one of said gear sets having an overspeed gear ratio and another of said gear sets having an underspeed gear ratio with respect to the rate of rotation of the engine shaft and means operable independently of said gear sets and the engine shaft to actuate the ring gear in either direction of rotation to feather and/or vary the pitch of the propeller blades in either direction when the engine shaft is idle.

HARRY P. REIBER.
JACK B. REIBER.